United States Patent Office 3,151,717
Patented Oct. 6, 1964

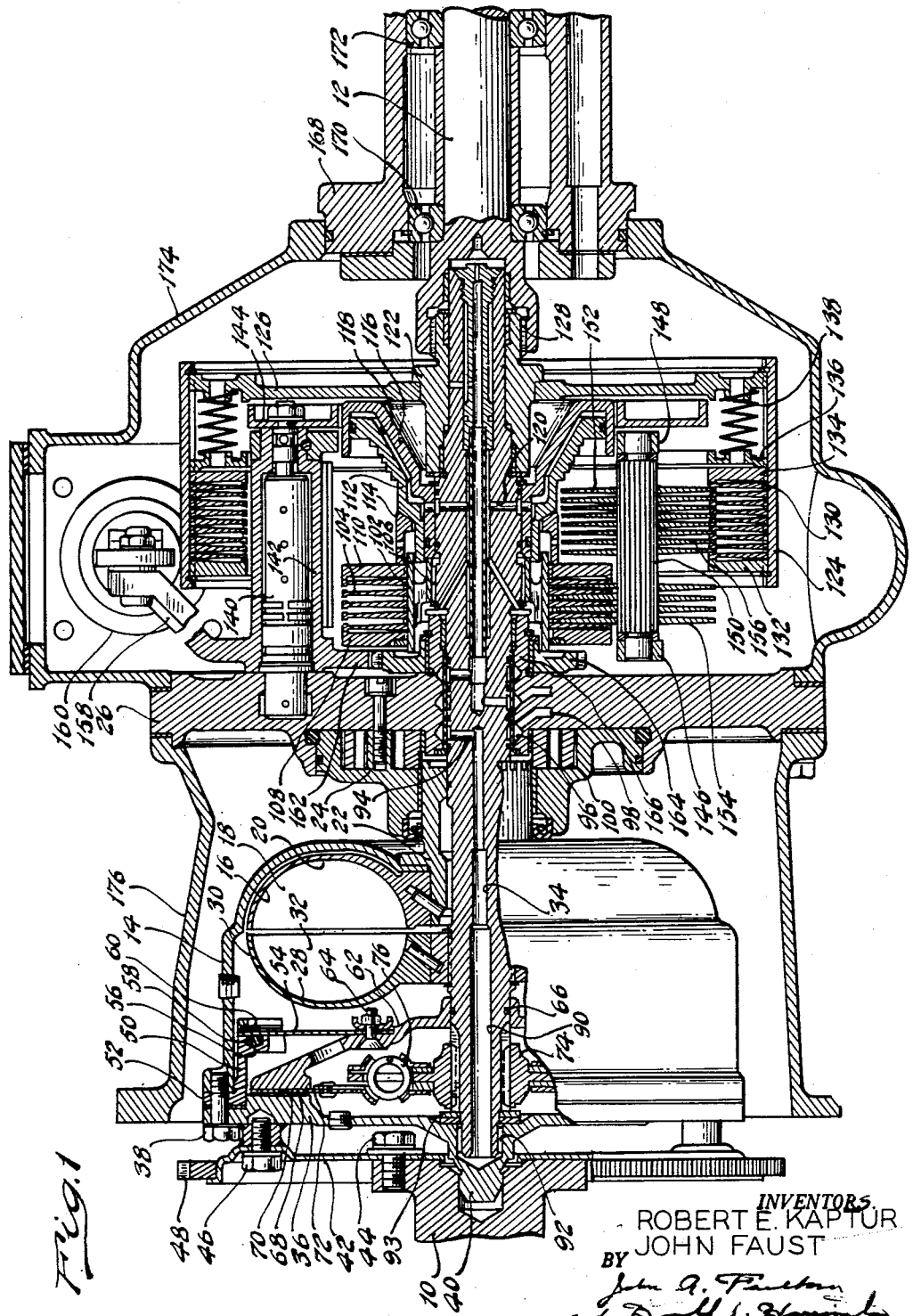

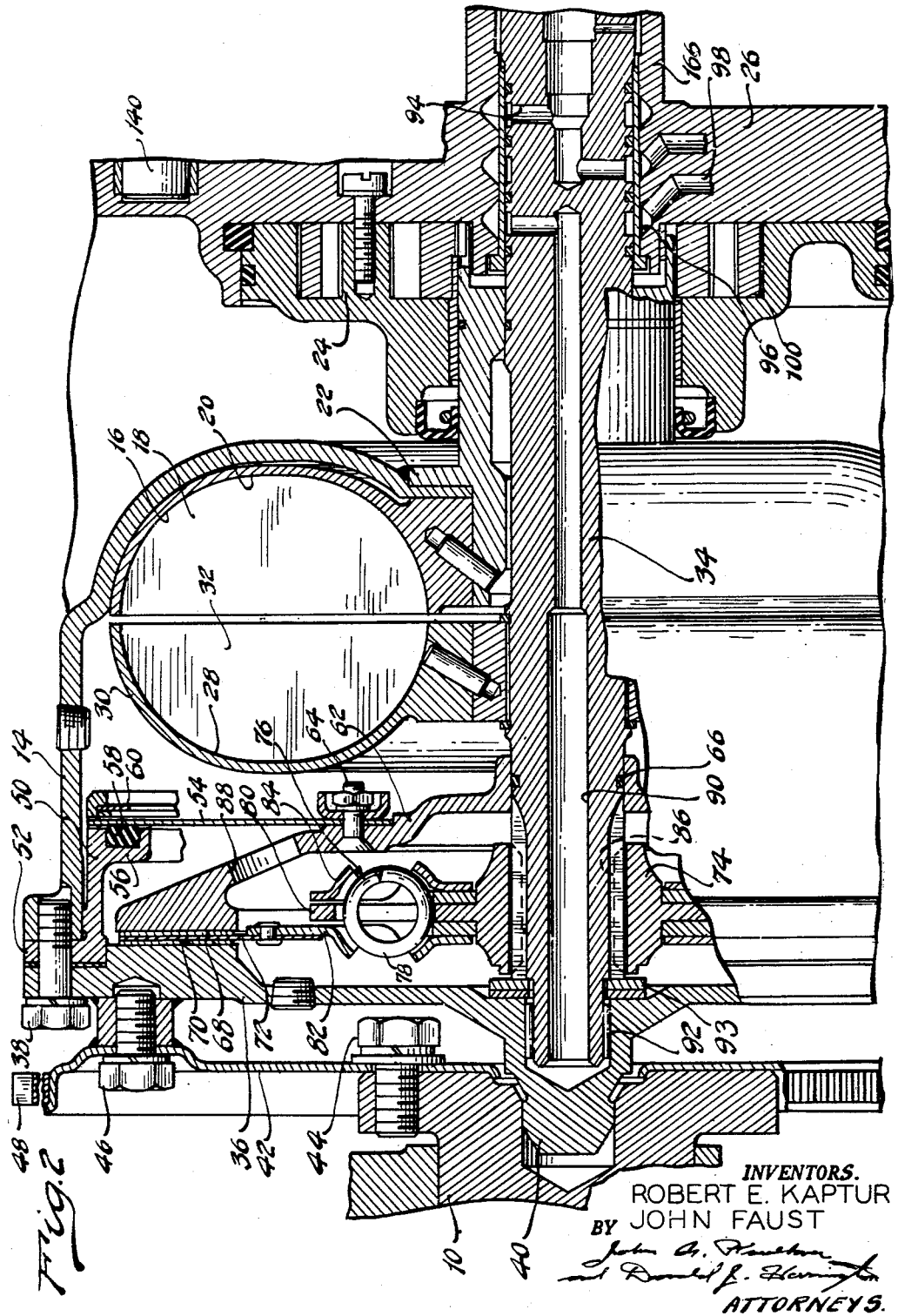

3,151,717
DIAPHRAGM TYPE LOCK-UP CLUTCH
ASSEMBLY
Robert E. Kaptur, Birmingham, and John Faust, Berkley, Mich., assignors to Ford Motor Company, Dearborn, Mich., a corporation of Delaware
Filed Sept. 21, 1960, Ser. No. 57,512
17 Claims. (Cl. 192—3.2)

Our invention relates generally to torque transmitting clutches, and more particularly to a fluid pressure operated clutch capable of forming a driving connection between rotary portions of a power transmission mechanism.

A principal feature of our invention resides in the provision of a friction clutch having a movable portion that can be hydraulically loaded to produce a clutch energizing force, the movable portion defining a portion of a flexible diaphragm assembly that forms a separation between two pressure regions.

The spring properties of the diaphragm are utilized for the purpose of returning the movable clutch portion to a clutch release position when the pressure forces on the diaphragm are reduced.

The clutch can be energized by suitably controlling the pressure differential across the diaphragm. The diaphragm can then be used in lieu of a conventional clutch servo piston, and the clutch construction is thus considerably simplified. The provision of such a simplified clutch construction is one of the objects of our invention.

It is a further object of our invention to eliminate the centrifugal pressure force unbalance that often is present in conventional clutch constructions. This problem becomes of importance when the clutches are operated at high operating speeds, or when relatively large clutch servo diameters are employed. In our improved clutch construction this problem is overcome by providing balanced pressure forces on each side of the flexible diaphragm. Any change in the centrifugal pressure on one side of the diaphragm will be accompanied by a corresponding change on the other side, the opposed forces acting on the diaphragm itself and on the other movable clutch energizing portions of the assembly thereby being balanced at all operating speeds.

It is a further object of our invention to provide a clutch construction of the type above set forth wherein a movable diaphragm is employed for establishing clutch energizing hydrostatic forces and wherein this same diaphragm is used for forming a portion of a secondary torque delivery path extending from the driving member to the driven member.

It is a further object of our invention to provide a fluid pressure operated clutch for use in a power transmission mechanism wherein the fluid pressure operated movable portions of the clutch assembly are uninfluenced by changes in the centrifugal pressure that is created due to rotation of the clutch at relatively high operating speeds. We also contemplate that these movable portions can be hydraulically loaded against the opposing influence of a return spring pressure for the purpose of energizing the clutch.

It is a further object of our invention to provide a clutch assembly of the type above described wherein the return spring force is obtained by utilizing the resilient properties of the movable portions of the clutch mechanism.

For the purpose of particularly describing the principal features of our invention, we have disclosed our clutch construction in combination with an infinitely variable friction disc type drive. When used in this environment, our clutch construction is capable of providing a direct drive connection between an engine crankshaft and the power input shaft for the friction discs. When the clutch is disengaged, a driving connection between the input shaft for the discs and the engine crankshaft is established by means of a fluid coupling.

Throughout this particular description, reference will be made to the accompanying drawings wherein:

FIGURE 1 shows a cross sectional assembly view of a friction disc drive embodying our improved clutch construction; and FIGURE 2 shows an enlarged cross sectional view taken in the plane that contains the axis of rotation of the taken in the plane that contains the axis of rotation of the construction at the power input side of the mechanism of FIGURE 1.

Referring first to FIGURE 1, numeral 10 designates a portion of a crankshaft for an engine not shown, and numeral 12 designates a transmission power output shaft.

A pump shell is shown at 14 and it has secured therein an outer pump shroud 16 within which pump blades 18 are situated. The shroud 16 and blades 18 define a coupling pump member that is identified by reference character 20. The hub portion 22 of the pump 20 extends axially within a transmission pump cover 24 which in turn is secured to a wall 26 for the friction disc drive portion of the mechanism hereinafter described.

A coupling turbine member is shown at 28, and it is comprised of an outer shroud 30 and turbine blades 32. The hub of turbine 28 is splined or otherwise positively connected to a power input shaft 34 for the above-mentioned disc drive portion of the mechanism.

An end wall 36 is secured to pump housing 14 by suitable bolts 38, said housing 14 being formed with a peripheral flange as indicated to accommodate the bolts 38.

The hub portion of wall 36 defines a pilot member 40 which is received within a cooperating pilot opening in the end of crankshaft 10. Crankshaft 10 is drivably connected to wall 36 by means of a drive plate 42, said plate 42 being bolted by means of bolts 44 to a flange on crankshaft 10. The outer periphery of plate 42 is secured to adjacent wall 36 by bolts 46. The periphery of plate 42 carries an engine starter ring gear 48 in the usual fashion.

An adapter is shown at 50. This adapter is annular in form, and it is situated at the radially outward region of pump housing 14. It includes a flange 52 that is situated between the wall 36 and the periphery of housing 14. It is held in place by bolts 38.

An annular diaphragm, which may be made of steel, is shown at 54, and its outer periphery is situated in engagement with the adapter 50. Adapter 50 includes a boss 56 having a recess for accommodating an O-ring seal 58, the outer periphery of diaphragm 54 engaging the boss 56 so that the O-ring seal 58 will provide an effective seal between the adapter 50 and the diaphragm 54. A suitable snap ring, preferably of the multiple turn variety, is shown at 60, and it is secured in place within a suitable snap ring recess adjacent the right-hand side of the outer periphery of diaphragm 54 for retaining the latter in assembled relationship with respect to the adapter 50.

The inner periphery of the diaphragm 54 is secured to a clutch member 62, suitable clamping bolts 64 being provided for this purpose. Member 62 is formed with a central opening through which shaft 34 extends. A sealing ring 66 is carried by shaft 34 for providing a sliding sealing relationship between member 62 and shaft 34.

The outer periphery of member 62 is formed with a clutch surface 68 that is disposed in adjacent relationship with respect to the clutch surface 70 formed on the interior of wall 36.

The clutch plate 72 extends between the clutch surfaces 68 and 70, and it is connected to a clutch hub member 74 by means of a connection 76, the latter preferably including conventional damper springs that are mounted in the usual fashion. These damper springs are best seen in FIGURE 2, and they are identified by reference character 78.

The hub member 74 includes a radially extending plate 80 having recesses within which the springs 78 are situated. The clutch plate 72 is riveted or otherwise positively secured to a plate 82, and it cooperates with a cage member 84 to define an enclosure for springs 78. This enclosure engages the axial ends of the springs 78 so that a limited degree of lost motion may occur between clutch hub member 74 and the plate 72. This lost motion is permitted by the yieldable springs 78. Hub 74 is positively splined to shaft 34 as indicated at 86.

The wall 36, the member 62 and the diaphragm 54 cooperate to define a fluid pressure chamber. Member 62 is apertured as shown at 88 to permit uniform distribution of fluid pressure throughout the entire pressure chamber.

The portion of the pump housing 14 on the right-hand side of the diaphragm 54, as viewed in FIGURES 1 and 2, is subjected to the charge pressure for the fluid coupling. This charge pressure establishes a pressure force on the diaphragm 54 and on the member 62 tending to urge the latter into frictional engagement with the clutch plate 72 to establish a driving connection between crankshaft 10 and shaft 34. The forces produced by this pressure are opposed by the pressure forces in the pressure chamber on the left-hand side of diaphragm 54, as viewed in FIGURES 1 and 2, so that the net clamping pressure provided by member 62 is proportional to the pressure differential between these two chambers.

Pressure can be supplied to the chamber on the left-hand side of diaphragm 54 through a central passage 90 in shaft 34. This pressure is distributed around the left-hand end of shaft 34, past needle bearings 92 and through suitable grooves formed in thrust washers 93. Needle bearings 92 are situated within a bearing opening formed in the hub of wall 36, the left-hand end of shaft 34 thereby being rotatably journaled within wall 36.

The right-hand end of passage 90 communicates with a radial passage 94 which in turn communicates with a groove 96 formed in wall 26 of the housing for the disc drive portion of the mechanism.

Groove 96 in turn communicates with a passage 98. Passage 98 forms a portion of an automatic control circuit not shown. This control circuit is supplied with fluid pressure by a fluid pressure pump generally identified by reference character 100. This pump is of the positive displacement type, and it is situated between pump cover 24 and wall 26. The driving member for the pump 100 can be keyed or otherwise positively connected to an axial extension for hub 22 of the pump 20.

Referring next to the disc drive portion of the mechanism, the shaft 10 has secured thereto a hub 102 for an assembly of power input sun discs 104. The hub 102 is suitably splined to shaft 34 as indicated at 106. The assembly 104 comprises a plurality of friction discs with enlarged outer peripheral portions. The inner peripheral portions of the discs are splined to hub 102 and are adapted to shift therein in an axial direction. A clutch disc back-up member 108 is carried by hub 102, and axial movement of this member is prevented by a suitable snap ring.

A clamping plate is shown at 110, and a clamping pressure may be supplied thereto by means of an annular piston 112. A thrust member 114 is situated between piston 112 and the clamping plate 110.

Piston 112 is concentrically disposed about a cylinder member 116 that in turn is concentrically positioned on shaft 34 and held thereon by suitable snap rings. This piston 112 and the cylinder 116 cooperate to define a pressure cavity 118, and fluid pressure may be distributed to this cavity through suitable passage structure shown in part at 120. This passage structure communicates with other passage structure centrally located within the shaft 34, said other passage structure forming a portion of the control circuit above mentioned.

The right-hand end of shaft 34 is received within a hub member 122 for a clutch disc drum 124. Drum 124 is connected to and supported by an end wall 126 which is positively connected to the hub 122. Hub 122 is in turn splined, as shown at 128, to the left-hand end of power output shaft 12.

The interior of drum 124 is splined to accommodate a driving connection with externally splined friction discs 130 which are assembled in side-by-side relationship as shown in FIGURE 1. A reaction plate 132 is carried by drum 124, and axial movement of the latter is prevented by a suitable snap ring. Clamping pressure can be applied to the discs of the assembly 130 by an annular clamping plate 134 and by a cooperating clamping member 136.

Clamping member 136 is spring urged in a left-hand direction, as viewed in FIGURE 1, by a plurality of compression springs 138, said springs being anchored on wall 126.

A plurality of spindle shafts is carried by wall 26. One such shaft is shown at 140 and it is supported in a cantilever fashion as indicated. A sleeve 142 is positioned about the shaft 140. The outward end of shaft 140 is formed with a reduced diameter, and it is connected to an annular supporting ring 144, said ring serving to interconnect the extended ends of each of the shafts 140 to form a rigid subassembly. Sleeve 142 is formed with a pair of spaced arms 146 and 148, as viewed in the lower portion of FIGURE 1. An externally splined shaft 150 is then supported by these arms 146 and 148, and internally splined planet discs 152 are secured thereto as indicated. Discs 152 are free to move in an axial direction on shaft 150, although relative rotation therebetween is prevented by the splined connection with shaft 150. The planet discs 152 are formed in two groups, one group being identified by reference character 154 and the other group being identified by reference character 156. The discs of group 154 are situated in frictional driving engagement with the sun discs 104, and are arranged in interdigital relationship with respect to the same. In a similar fashion the discs of group 156 are disposed in frictional driving engagement with the ring discs 130.

The planet discs of groups 154 and 156 are formed with a conical profile, and the inner rim portions of the discs 130, like the outer rim portions of the discs 104, are enlarged to permit a frictional driving engagement between the same and the conical lateral surfaces of the planet discs.

One of the sleeves 142 is formed with an arm 158 that can be rotated in one direction or the other about the axis of the associated spindle shaft 140 by means of a servo motor that is generally identified in FIGURE 1 by reference character 160. Each of the sleeves 142 is also formed with a gear segment 162 that drivably engages a gear 164 journaled by means of a suitable bushing on an extension 166 for the wall 26. When the arm 158 is rotated by the servo 160, each of the sleeves 142 will therefore rotate in unison, and the planet discs associated with each spindle shaft will therefore move in either a radially inward or a radially outward direction. In FIGURE 1, the planet discs are shown in a maximum speed ratio position. The outer peripheries of the sun discs 104 drivably engage the radially inward region of the planet disc group 154, and the rim portions for the ring discs 130 engage the outer peripheries of the planet discs of group 156. If the shaft 150 for each of the planet disc assemblies is moved in a radially outward direction, it will be apparent that the relative speed ratio between the shaft 12 and the shaft 34 will progressively decrease. An infinite variation in ratio can therefore be obtained by appropriately controlling the pressure distributed to servo 160.

Shaft 12 is journaled within an extension housing 168 by means of suitable bearings 170 and 172. The aforementioned wall 26 and the extension housing 68 form a portion of a transmission housing for the planet disc portion of the mechanism, said housing being shown at 174. Another housing portion for the fluid coupling and the forwardly positioned friction clutch is shown at 176. The housing 176 and the housing 174 form a unitary assembly as indicated.

During operation of our improved clutch structure, the pressure chamber on the left-hand side of the diaphragm 54 can be pressurized to disengage the clutch disc 72. Torque is then transferred through the fluid coupling to the sun discs 104. If it is desired, however, to bypass the fluid coupling and to provide an alternate torque delivery path between the engine crankshaft 10 and the sun discs 104, the pressure in the pressure chamber on the left-hand side of the diaphragm 54 can be exhausted through passage 90 as previously indicated and the charge pressure in the fluid coupling will therefore be effective to cause engagement of the friction clutch mechanism. This establishes a driving connection between shaft 34 and crankshaft 10.

When the clutch structure is rotated at relatively high speeds, centrifugal pressure will be developed on either side of the diaphragm 54 so that the net force unbalanced due to the presence of centrifugal pressure will be substantially eliminated. The desired amount of clamping pressure can therefore be used under all operating conditions.

When the clutch is engaged, the diaphragm 54 serves to transfer torque from the crankshaft 10 to the clutch disc 72. The diaphragm 54 functions in this fashion in the manner of a drive plate or torque transfer member.

Diaphragm 54 also functions as a diaphragm spring for normally urging the member 62 toward a clutch release position. When the clutch is applied, the diaphragm 54 will yield under the fluid pressure force acting on the diaphragm 54. The resilient properties of diaphragm 54 therefore assist the clutch release pressure in releasing the friction clutch mechanism. Further, in the event that both the fluid coupling and the pressure chamber on the left-hand side of the diaphragm 54 are depressurized, the diaphragm 54 will function to disengage the friction clutch mechanism without any assistance from the fluid pressure forces.

Having thus described a preferred embodiment of our invention, what we claim and desire to secure by U.S. Letters Patent is:

1. In a fluid pressure operated friction clutch for establishing a connection between driving and driven shafts, a rotary housing connected to said driving shaft, said housing being mounted for rotation about the axis of said driving shaft and having a pair of axially spaced walls, a first friction member connected to said driven shaft, a second friction member, and a flexible, annular diaphragm carried by said rotary housing intermediate its spaced walls to define within said housing a pair of opposed fluid pressure chambers, said second friction member being disposed in sliding and sealing relationship with respect to one of said shafts, one periphery of said diaphragm being secured to said housing and said second friction member being secured to the other periphery thereof whereby torque is delivered through said diaphragm from said driving shaft to said second friction member said diaphragm being adapted to yield in response to variations in the pressure differential between said chambers to permit said second friction member to move toward and away from said first friction member.

2. In a fluid pressure operated friction clutch for establishing a driving connection between a first shaft and a second shaft, a rotary housing connected to said first shaft, said housing being mounted for rotation about the axis of said first shaft and having a pair of axially spaced walls, a first friction member carried by said second shaft, a second friction member carried by said housing, and means for applying a clamping force to said friction members to establish a frictional driving connection therebetween, said means comprising a flexible, annular diaphragm carried by said housing intermediate its spaced walls to define within said housing a pair of opposed fluid pressure chambers, one periphery of said diaphragm being connected positively and drivably to said housing and the other periphery of thereof being connected to a movable portion of said force applying means, said diaphragm thereby being adapted to transfer driving torque from said first shaft to said second friction member, said second friction member being disposed in sliding and sealing relationship with respect to one of said shafts said clamping force being the resultant of the forces due to a pressure differential in said chambers.

3. In a fluid pressure operated friction clutch for establishing a connection between two relatively rotatable parts, a rotary housing connected to a first of said parts, a first friction member connected to the other of said parts, a second friction member connected to said first part, said housing being mounted for rotation about the axis of said first part and having a pair of axially spaced walls, and a flexible, annular diaphragm carried by said rotary housing intermediate its spaced walls to define within said housing a pair of opposed fluid pressure chambers, the outer periphery of said diaphragm being secured to said housing, said second friction member being secured to the inner periphery of said diaphragm whereby torque is delivered through said diaphragm from said first part to said second friction member, said second friction member being disposed in sliding and sealing relationship with respect to one of said parts, said diaphragm being adapted to yield in response to variations in the pressure differential between said chambers to permit said second friction member to move toward and away from said first friction member.

4. A fluid pressure operated friction clutch for establishing a driving connection between a driving shaft and a driven shaft, a rotary housing connected to said driving shaft, said housing being mounted for rotation about the axis of said driving shaft and having a pair of axially spaced walls, a friction clutch means for establishing a frictional driving connection between said driving and driven shafts including first and second relatively movable friction members, and means for applying a clamping force to said friction members, said clamping force applying means comprising a flexible, annular diaphragm carried by said housing intermediate its spaced walls to define within said housing a pair of opposed fluid pressure chambers, the outer periphery of said diaphragm being connected drivably to said housing and the inner periphery thereof being connected to a movable portion of said force applying means, said diaphragm thereby being adapted to deliver torque from said driving shaft to said force applying means, said force applying means being situated in sliding and sealing relationship with respect to one of said shafts, said clamping force being the result of a pressure differential in said chambers.

5. In a power transmission mechanism, a first torque delivery shaft, a second torque delivery shaft, a hydrokinetic unit comprising a pump member connected to said first shaft and a turbine member connected to said second shaft, said pump member comprising a housing, a flexible, annular diaphragm within said housing, means for securing one periphery of said diaphragm to the interior of said housing, and a friction clutch means for establishing a driving connection between said shafts, said connection bypassing said hydrokinetic unit, a movable portion of said friction clutch means being secured to the other periphery of said diaphragm, said diaphragm defining in part opposed fluid pressure chambers, said hydrokinetic unit being disposed in one chamber and said friction clutch elements being disposed in the other chamber.

6. In a power transmission mechanism, a first torque delivery shaft, a second torque delivery shaft, a hydrokinetic unit comprising a pump member connected to said first shaft and a turbine member connected to said second shaft, said pump member comprising a housing, a flexible, annular diaphragm within said housing, means for securing the outer periphery of said diaphragm to the interior of said housing, and a friction clutch means for establishing a driving connection between said shafts, said connection bypassing said hydrokinetic unit, a movable portion of said friction clutch means being secured to the inner periphery of said diaphragm, said diaphragm defining in part opposed fluid pressure chambers, said hydrokinetic unit being disposed in one chamber and said friction clutch element being disposed in the other.

7. In a power transmission mechanism, a first torque delivery shaft, a second torque delivery shaft, a hydrokinetic unit comprising a pump member connected to said first shaft and a turbine member connected to said second shaft, said pump member comprising a housing, a flexible, annular diaphragm within said housing, means for securing one periphery of said diaphragm to the interior of said housing, and a friction clutch means for establishing a driving connection between said shafts, said connection bypassing said hydrokinetic unit, a movable portion of said friction clutch means being secured to the other periphery of said diaphragm, said diaphragm defining in part opposed fluid pressure chambers, said hydrokinetic unit being disposed in one chamber and said friction clutch elements being disposed in the other chamber, said movable portion of said friction clutch means being annular in form and being slidably positioned about said driven shaft, the fluid pressure in said one chamber acting on said diaphragm and on said movable member to urge the latter toward a clutch disengaging position in opposition to the fluid pressure force exerted by the charging pressure in said hydrokinetic unit.

8. In a power transmission mechanism for delivering power from a driving shaft to a driven shaft, a hydrokinetic unit comprising a pump member, a turbine member, a common housing enclosing said pump and turbine members, and a lockup friction clutch means for establishing a direct driving connection between said driving and driven shafts, said clutch means comprising a flexible diaphragm, one periphery of said diaphragm being secured within said housing and partly defining therewith a pair of opposed fluid pressure chambers, a movable portion of said clutch means being secured to the other periphery of said diaphragm.

9. In a power transmission mechanism for delivering power from a driving shaft to a driven shaft, a hydrokinetic unit comprising a pump member and a turbine member, a common housing enclosing said pump and turbine members, and a lockup friction clutch means for establishing a direct driving connection between said driving shaft and said driven shaft, said clutch means comprising a flexible diaphragm, the outer periphery of said diaphragm being secured to the interior of said housing, said diaphragm cooperating with said housing to partly define a pair of opposed fluid pressure chambers, a movable portion of said clutch means being secured to the inner periphery of said diaphragm and movable into and out of a clutch engaging position in response to variations in the pressure differential between said chambers.

10. In a power transmission mechanism for delivering power from a driving shaft to a driven shaft, a hydrokinetic unit comprising a pump member and a turbine member, a common housing enclosing said pump and turbine members, and a lockup friction clutch means for establishing a direct driving connection between said driving shaft and said driven shaft, said clutch means comprising a flexible diaphragm with inner and outer peripheries, the outer periphery of said diaphragm being secured to the interior of said housing, said diaphragm cooperating with said housing to partly define a pair of opposed fluid pressure chambers, a movable portion of said clutch means being secured to the inner periphery of said diaphragm and movable into and out of a clutch engaging position in response to variations in the pressure differential between said chambers, said diaphragm normally urging said movable portion toward a clutch disengaging position.

11. In a power transmission mechanism for delivering power from a driving shaft to a driven shaft, a hydrokinetic unit comprising a pump member, a turbine member, a common housing enclosing said pump and turbine members, and a lockup friction clutch means for establishing a direct driving connection between said driving and driven shafts, said clutch means comprising an annular flexible diaphragm, one periphery of said diaphragm being secured within said housing and partly defining therewith a pair of opposed fluid pressure chambers, a movable portion of said clutch means being secured to the other periphery of said diaphragm, said diaphragm normally urging said movable portion toward a clutch disengaging position.

12. In a power transmission mechanism for delivering power from a driving shaft to a driven shaft, a hydrokinetic unit comprising a pump member, a turbine member, a common housing enclosing said pump and turbine members, and a lockup friction clutch means for establishing a direct driving connection between said driving member and said driven member comprising an annular, flexible diaphragm having inner and outer peripheries, one periphery of said diaphragm being secured to said housing and partly defining therewith a pair of opposed fluid pressure chambers, a movable portion of said clutch means being secured to the other periphery of said diaphragm, said clutch means being disposed in one of said pressure chambers and said hydrokinetic unit being disposed in the other, said movable portion being urged into and out of a clutch engaging position in response to changes in the ratio of the pressure in said hydrokinetic unit to the pressure in said one chamber.

13. In a power transmission mechanism, a driving member, a driven member, a hydrokinetic unit comprising a pump member and a turbine member situated in juxtaposed fluid flow relationship, said pump member comprising a housing enclosing said turbine member, said turbine member being connected to said driven member, said housing being connected to said driving member, a lockup clutch for establishing a direct driving connection between said driving member and said driven member, said lockup clutch comprising a friction disc connected to said driven member, an annular diaphragm situated within said housing, one periphery of said diaphragm being connected to said housing, a movable clutch member connected to the other periphery of said diaphragm, said movable clutch member and said diaphragm cooperating with said housing to define a pair of opposed fluid pressure chambers, a friction member carried by said housing, said friction disc being situated between said movable member and said friction member, and means for controlling the ratio of the magnitudes of the fluid pressures in said chambers, said movable member being urged into and out of clutching engagement in response to variations in said ratio.

14. In a power transmission mechanism, a driving member, a driven member, a hydrokinetic unit comprising a pump member and a turbine member situated in juxtaposed fluid flow relationship, said pump member comprising a housing enclosing said turbine member, said turbine member being connected to said driven member, said housing being connected to said driving member, a lockup clutch for establishing a direct driving connection between said driving member and said driven member, said lockup clutch comprising a friction disc connected to said driven member, an annular diaphragm situated within said housing, the outer periphery of said diaphragm being connected to said housing, a movable clutch member connected to the inner periphery of said diaphragm, said movable clutch member and said diaphragm cooperating with said housing to define a pair of opposed fluid pressure chambers, a friction member carried by said housing, said friction disc being situated between said movable member and said friction member, and means for controlling the ratio of the magnitudes of the fluid pressures in said chambers, said movable member being urged into and out of clutching engagement in response to variations in said pressure differential.

15. In a power transmission mechanism, a driving member, a driven member, a hydrokinetic unit comprising a pump member and a turbine member situated in juxtaposed fluid flow relationship, said pump member comprising a housing enclosing said turbine member, said turbine member being connected to said driven member, said housing being connected to said driving member, a lockup clutch for establishing a direct driving connection between said driving member and said driven member, said lockup clutch comprising a friction disc connected to said driven member, an annular diaphragm situated within said housing, one periphery of said diaphragm being connected to said housing, a movable clutch member connected to the other periphery of said diaphragm, said movable clutch member and said diaphragm cooperating with said housing to define a pair of opposed fluid pressure chambers, a friction member carried by said housing, said friction disc being situated between said movable member and said friction member, and means for controlling the ratio of the fluid pressures in each of said chambers, said movable member being urged into and out of clutching engagement in response to variations in said pressure differential, said diaphragm being yieldable in response to the pressure variations in said pressure chambers and adapted to normally urge said movable member toward a clutch disengaging position.

16. In a power transmission mechanism, a first torque delivery shaft, a second torque delivery shaft, a hydrokinetic unit comprising a pump member connected to said first shaft and a turbine member connected to said second shaft, said pump member comprising a housing, a flexible, annular diaphragm within said housing, means for securing the outer periphery of said diaphragm to the interior of said housing, and a friction clutch means for establishing a driving connection between said shafts, said connection bypassing said hydrokinetic unit, a movable portion of said friction clutch means being secured to the inner periphery of said diaphragm, said diaphragm defining in part opposed fluid pressure chambers, said hydrokinetic unit being disposed in one chamber and said friction clutch element being disposed in the other, said movable portion of said clutch means being formed with at least one aperture, said aperture providing free fluid communication between opposed sides of said movable portion thereby establishing uniform pressure distribution throughout said other chamber.

17. In a power transmission mechanism for delivering power from a driving shaft to a driven shaft, a hydrokinetic unit comprising a pump member, a turbine member, a common housing enclosing said pump and turbine members, and a lockup friction clutch means for establishing a direct driving connection between said driving member and said driven member comprising an annular, flexible diaphragm having inner and outer peripheries, one periphery of said diaphragm being secured to said housing and partly defining therewith a pair of opposed fluid pressure chambers, a movable portion of said clutch means being secured to the other periphery of said diaphragm, said clutch means being disposed in one of said chambers and said hydrokinetic unit being disposed in the other, said movable portion being urged into and out of a clutch engaging position in response to changes in the ratio of the pressure in said hydrokinetic unit to the pressure in said one chamber, said movable portion of said clutch means being formed with at least one aperture to accommodate free fluid communication between opposed sides of said movable portion thereby establishing uniform pressure distribution throughout said one pressure chamber.

References Cited in the file of this patent

UNITED STATES PATENTS

| | | |
|---|---|---|
| 2,163,202 | Kegresse | June 20, 1939 |
| 2,517,972 | Cardwell et al. | Aug. 8, 1950 |
| 2,518,016 | Johnson et al. | Aug. 8, 1950 |
| 2,589,291 | Sanford | Mar. 18, 1952 |
| 2,652,913 | Schou | Sept. 22, 1953 |
| 2,675,102 | Robinson | Apr. 13, 1954 |
| 2,894,609 | Tattersall | July 14, 1959 |
| 2,929,270 | Tuck et al. | Mar. 22, 1960 |
| 2,931,475 | Humphrey | Apr. 5, 1960 |
| 2,953,038 | Richards | Sept. 20, 1960 |

FOREIGN PATENTS

| | | |
|---|---|---|
| 131,749 | Australia | Mar. 14, 1949 |